(12) United States Patent
Boo et al.

(10) Patent No.: US 11,074,507 B1
(45) Date of Patent: Jul. 27, 2021

(54) METHOD FOR PERFORMING ADJUSTABLE CONTINUAL LEARNING ON DEEP NEURAL NETWORK MODEL BY USING SELECTIVE DEEP GENERATIVE REPLAY MODULE AND DEVICE USING THE SAME

(71) Applicant: Stradvision, Inc., Pohang-si (KR)

(72) Inventors: SukHoon Boo, Anyang-si (KR); Sung An Gweon, Seoul (KR); Yongjoong Kim, Pohang-si (KR); Wooju Ryu, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 17/136,847

(22) Filed: Dec. 29, 2020

Related U.S. Application Data

(60) Provisional application No. 63/028,779, filed on May 22, 2020.

(51) Int. Cl.
  *G06N 3/08* (2006.01)
  *G06N 3/04* (2006.01)
(52) U.S. Cl.
  CPC .......... *G06N 3/088* (2013.01); *G06N 3/0454* (2013.01)
(58) Field of Classification Search
  CPC ............ G06N 3/08; G06N 3/088; G06N 3/04; G06N 3/0454; G06N 3/0445; G06N 3/045
  See application file for complete search history.

(56) References Cited

PUBLICATIONS

Shin et al. Continual Learning with Deep Generative Replay, NIPS 2017, p. 10.*
Lemley et al. "Smart Augmentation Learning an Optimal Data Augmentation Strategy", IEEE Access, 2017, pp. 5858-5869.*

* cited by examiner

*Primary Examiner* — Li Wu Chang
(74) *Attorney, Agent, or Firm* — Kaplan Breyer Schwarz, LLP

(57) ABSTRACT

A method of adjustable continual learning of a deep neural network model by using a selective deep generative replay module is provided. The method includes steps of: a learning device (a) (i) inputting training data from a total database and a sub-database into the selective deep generative replay module to generate first and second low-dimensional distribution features, (ii) inputting binary values, random parameters, and the second low-dimensional distribution features into a data generator to generate a third training data, and (iii) inputting a first training data into a solver to generate labeled training data; (b) inputting the training data, the low-dimensional distribution features, and the binary values into a discriminator to generate a first and a second training data scores, a first and a second feature distribution scores, and a third training data score; and (c) training the discriminator, the data generator, the distribution analyzer and the solver.

20 Claims, 7 Drawing Sheets

METHOD FOR PERFORMING ADJUSTABLE CONTINUAL LEARNING ON DEEP NEURAL NETWORK MODEL BY USING SELECTIVE DEEP GENERATIVE REPLAY MODULE AND DEVICE USING THE SAME

CROSS REFERENCE TO RELATED APPLICATION

This application claims the benefit of priority to U.S. Provisional Patent Application No. 63/028,779, filed on May 22, 2020, the entire contents of which being incorporated herein by reference.

FIELD OF THE DISCLOSURE

The present disclosure relates to a method for performing continual learning on a deep neural network model and a device using the same; and more particularly, to the method for performing adjustable continual learning on the deep neural network model by using a selective deep generative replay module adopting a Generative Adversarial Network (GAN), and a learning device using the same.

BACKGROUND OF THE DISCLOSURE

In a neural network model adopting deep learning, various continuous learning techniques are applied in order to continuously train the neural network model by using data from both an existing database and a new database.

Herein, with data constantly piling up, a mechanism to efficiently train the neural network model regardless of the amount of the data is essential to effectively carry out continual learning.

FIG. 1 shows a configuration for a conventional continual learning technique.

By referring to FIG. 1, on condition that an existing model has been trained for an existing task by using the existing database, if a new task and its corresponding new database are given, the existing model is trained using both the existing database and the new database, to thereby generate a new model capable of performing both the existing task and the new task.

However, in the conventional continual learning technique, a size of a database may be expanded continuously to perform training processes for a certain task, and accordingly, there may be a problem in that a storage capacity required to store the data should also be expanded continuously.

Also, as the size of the database required for performing the training processes increases constantly in the conventional continual learning technique, the time required for training the neural network model by using the database also increases, resulting in a drop in the efficiency of the training processes.

Adding to this, as shown in FIG. 1, in case that a required task to be performed by the neural network model changes in response to inputting the new database, a method for adjusting the training processes is required to perform the new task given to the neural network model, however, the conventional continual learning technique cannot adjust the training processes as desired. In case an existing neural network model is trained to improve its accuracy of lane detection on a general road map, a new task, e.g., a fast lane detection on a highway, can be given during its continual learning, but the conventional continual learning technique cannot accommodate efficiently the training processes of, e.g., adjusting a usage ratio between the existing data and the new data according to the new task.

Therefore, an enhanced method for solving the aforementioned problems is required.

SUMMARY OF THE DISCLOSURE

It is an object of the present disclosure to solve all the aforementioned problems.

It is another object of the present disclosure to reduce space required for storing an existing database by only storing a selective deep generative replay module instead of storing the entire existing database used for training a neural network model.

It is still another object of the present disclosure to train the neural network model with a fixed amount of data, created by using the selective deep generative replay module, instead of using the entire existing database and an entire new database, to thereby reduce time required to train the neural network model.

It is still yet another object of the present disclosure to create a data set comprised of first-type data whose distribution is similar to that of a new database and second-type data whose distribution is different from that of the new database by using the selective deep generative replay module with a Generative Adversarial Network (GAN) and then train the neural network model using the created data set, to thereby generate the neural network model optimized for the given task, instead of training the neural network model with the entire existing database and the entire new database.

In order to accomplish the objects above, distinctive structures of the present disclosure are described as follows.

In accordance with one aspect of the present disclosure, there is provided a method for performing adjustable continual learning on a deep neural network model by using a selective deep generative replay module, including steps of: (a) a learning device, if a first training data is acquired from a total database and a second training data is acquired from a sub-database which is a subset of the total database, performing or supporting another device to perform (i) a process of inputting the first training data and the second training data into the selective deep generative replay module, to thereby allow the selective deep generative replay module to generate first low-dimensional distribution features for training corresponding to the first training data and second low-dimensional distribution features for training corresponding to the second training data through a distribution analyzer included in the selective deep generative replay module, wherein a dimension of the first low-dimensional distribution features for training is lower than a dimension of the first training data and wherein a dimension of the second low-dimensional distribution features for training is lower than a dimension of the second training data, (ii) a process of inputting (1) at least one binary value for training outputted from a dynamic binary generator included in the selective deep generative replay module, (2) at least one random parameter outputted from a random parameter generator included in the selective deep generative replay module, and (3) the second low-dimensional distribution features for training into a data generator included in the selective deep generative replay module, to thereby generate a third training data corresponding to the second low-dimensional distribution features for training, according to the binary value for training and the random parameter through the data generator, and (iii) a process of inputting the first training data into a solver included in the selective deep generative replay module, to thereby allow the solver to generate labeled training data by labeling the first training data on a basis of deep learning; (b) the learning device performing or supporting another device to perform a process of inputting the first training data, the second training data, the first low-dimensional distribution features for training, the second low-dimensional distribution features for training, the third training data and the binary value for training into a discriminator, to thereby allow the discriminator to generate a first training data score, a second training data score, a first feature distribution score, a second feature distribution score, and a third training data score, according to the binary value for training; and (c) the learning device performing or supporting another device to perform (i) a process of calculating (1) a first discriminator loss by referring to the second training data score, the second feature distribution score, and the third training data score, (2) a second discriminator loss by referring to the first training data score, the first feature distribution score, and the third training data score, (3) a first generator loss by referring to the second feature distribution score and the third training data score, and (4) a second generator loss by referring to the first feature distribution score, the second feature distribution score, and the third training data score, (ii) a process of training the discriminator, the data generator, and the distribution analyzer such that the data generator generates (ii-1) the third training data whose at least one of a mean and a variance of feature distribution thereof is within its corresponding each of training-data threshold ranges from that of the second low-dimensional distribution features for training, if the binary value for training is determined as a first binary value and (ii-2) the third training data whose mean and variance of the feature distribution thereof are outside the respective training-data threshold ranges from those of the second low-dimensional distribution features for training, if the binary values for training is determined as equal to a second binary value, and (iii) a process of further calculating a solver loss by referring to the labeled training data and its corresponding ground truth, to thereby further train the solver with the solver loss.

As one example, at the step of (c), by referring to the binary value for training, the learning device performs or supports another device to perform (i) if the binary value for training is determined as equal to the first binary value, a process of training the discriminator and the distribution analyzer by using the first discriminator loss and a process of training the data generator and the distribution analyzer by using the first generator loss and (ii) if the binary value for training is determined as equal to the second binary value, a process of training the discriminator and the distribution analyzer by using the second discriminator loss and a process of training the data generator and the distribution analyzer by using the second generator loss.

As one example, the learning device performs or supports another device to perform (i) a process of training the discriminator and the distribution analyzer by using the first discriminator loss and the second discriminator loss while first parameters of the data generator are fixed and (ii) a process of training the data generator and the distribution analyzer by using the first generator loss and the second generator loss while second parameters of the discriminator are fixed.

As one example, the data generator includes at least one encoding layer and at least one decoding layer.

In accordance with another aspect of the present disclosure, there is provided a method for performing adjustable continual learning on a deep neural network model by using a selective deep generative replay module, including steps of: (a) on condition that a learning device has performed or supported another device to perform, (i) upon acquiring a first training data from a total database and acquiring a second training data from a sub-database which is a subset of the total database, (i-1) a process of inputting the first training data and the second training data into the selective deep generative replay module, to thereby allow the selective deep generative replay module to (1) generate first low-dimensional distribution features for training corresponding to the first training data and second low-dimensional distribution features for training corresponding to the second training data through a distribution analyzer included in the selective deep generative replay module, wherein a dimension of the first low-dimensional distribution features for training is lower than a dimension of the first training data and wherein a dimension of the second low-dimensional distribution features for training is lower than a dimension of the second training data, (2) input at least one binary value for training outputted from a dynamic binary generator included in the selective deep generative replay module, at least one random parameter for training outputted from a random parameter generator included in the selective deep generative replay module, and the second low-dimensional distribution features for training into a data generator included in the selective deep generative replay module, and thus generate a third training data, corresponding to the second low-dimensional distribution features for training, according to the binary value for training and the random parameter for training, through the data generator, and (3) input the first training data into a solver included in the selective deep generative replay module to label the first training data and thus output labeled training data based on deep learning, through the solver, (i-2) a process of inputting the first training data, the second training data, the first low-dimensional distribution features for training, the second low-dimensional distribution features for training, the third training data and the binary value for training into a discriminator, to thereby allow the discriminator to output a first training data score, a second training data score, a first feature distribution score, a second feature distribution score, and a third training data score, according to the binary value for training, (ii) a process of inputting the first training data into the solver to thereby allow the solver to generate labeled training data by labeling the first training data based on the deep learning, (iii) process of calculating (1) a first discriminator loss by referring to the second training data score, the second feature distribution score, and the third training data score, (2) a second discriminator loss by referring to the first training data score, the first feature distribution score, and the third training data score, (3) a first generator loss by referring to the second feature distribution score and the third training data score, and (4) a second generator loss by referring to the first feature distribution score, the second feature distribution score, and the third training data score, (iv) a process of training the discriminator, the data generator, and the distribution analyzer such that the data generator generates (1) the third training data whose at least one of a mean and a variance of feature distribution thereof is within its corresponding each of training-data threshold ranges from that of the second low-dimensional distribution features for training, if the binary value for training is determined as equal to a first binary value and (2) the third training data whose mean and variance of the feature distribution thereof are outside the respective training-data threshold ranges from those of the second low-dimensional distribution features for training, if the binary values for training is determined as equal to a second binary value, and (v) a process of further calculating a solver loss by referring to the labeled training data and its corresponding ground truth, to thereby further train the solver with the solver loss, a continual learning device performing or supporting another device to perform a process of acquiring a new data from a new database; and (b) the continual learning device performing or supporting another device to perform a process of inputting the new data into the selective deep generative replay module, to thereby allow the selective deep generative replay module to (i) generate new low-dimensional distribution features corresponding to the new data through the distribution analyzer, wherein a dimension of the new low-dimensional distribution features is lower than a dimension of the new data, (ii) input at least one binary value for testing outputted from the dynamic binary generator, at least one random parameter for testing outputted from the random parameter generator, and the new low-dimensional distribution features into the data generator, and thus generate a test data, corresponding to the new low-dimensional distribution features, according to the binary value for testing and the random parameter for testing, wherein the test data includes (1) first regeneration data whose at least one of a mean and a variance of feature distribution thereof is within its corresponding each of test-data threshold ranges from that of the new low-dimensional distribution features if the binary value for testing is determined as equal to the first binary value and (2) second regeneration data whose mean and variance of the feature distribution thereof are outside the respective test-data threshold ranges from those of the new low-dimensional distribution features if the binary value for testing is determined as equal to the second binary value, and (iii) a process of inputting the test data into the solver, to thereby allow the solver to generate a labeled test data by labeling the test data.

As one example, the method further includes steps of: (c) on condition that (1) the selective deep generative replay module has been replicated to generate an old selective deep generative replay module and (2) old low-dimensional distribution features including at least part of the first low-dimensional distribution features for training and the second low-dimensional distribution features for training have been inputted into the old selective deep generative replay module to generate an old data corresponding to the old low-dimensional distribution features and old labeled data corresponding to the old data, the continual learning device performing or supporting another device to perform (i) a process of inputting the old data, the new data, the old low-dimensional distribution features, the new low-dimensional distribution features, the test data, and the binary value for testing into the discriminator, to thereby allow the discriminator to generate an old data score, a new data score, an old feature distribution score, a new feature distribution score, and a test data score, according to the binary value for testing, and (ii) a process of inputting the old data and the new data into the solver, to thereby allow the solver to generate new labeled data by labeling the old data and the new data based on the deep learning; and (d) the continual learning device performing or supporting another device to perform (i) a process of calculating (1) a first new discriminator loss by referring to the new data score, the new feature distribution score, and the test data score, (2) a second new discriminator loss by referring to the old data score, the old feature distribution score, and the test data score, (3) a first new generator loss by referring to the new feature distribution score and the test data score, and (4) a second new generator loss by referring to the old feature distribution score, the new feature distribution score, and the test data score, (ii) a process of training the discriminator, the data generator, and the distribution analyzer such that the data generator generates (ii-1) the test data whose at least one of the mean and the variance of the feature distribution thereof is within its corresponding each of test-data threshold ranges from that of the new low-dimensional distribution features, if the binary value for testing is determined as equal to the first binary value and (ii-2) the test data whose mean and variance of the feature distribution thereof are outside the respective test-data threshold ranges from those of the new low-dimensional distribution features, if the binary values for testing is determined as equal to the second binary value, and (iii) a process of further calculating a new solver loss by referring to the new labeled data and the old labeled data, to thereby further train the solver with the new solver loss.

As one example, at the step of (b), the continual learning device performs or supports another device to perform a process of instructing the dynamic binary generator to generate the binary value for testing, wherein a data generation ratio of the first regeneration data per the second regeneration data is inputted into the dynamic binary generator, to thereby allow the dynamic binary generator to generate the binary value for testing corresponding to (1) the first binary value for generating the first regeneration data and (2) the second binary value for generating the second regeneration data, according to the data generation ratio.

As one example, at the step of (d), by referring to the binary value for testing, the continual learning device performs or supports another device to perform (i) if the binary value for testing is determined as equal to the first binary value, a process of training the discriminator and the distribution analyzer by using the first new discriminator loss and a process of training the data generator and the distribution analyzer by using the first new generator loss and (ii) if the binary value for testing is determined as equal to the second binary value, a process of training the discriminator and the distribution analyzer by using the second new discriminator loss and a process of training the data generator and the distribution analyzer by using the second new generator loss.

As one example, the continual learning device performs or supports another device to perform (i) a process of training the discriminator and the distribution analyzer by using the first new discriminator loss and the second new discriminator loss while first parameters of the data generator are fixed and (ii) a process of training the data generator and the distribution analyzer by using the first new generator loss and the second new generator loss while second parameters of the discriminator are fixed.

As one example, the data generator includes at least one encoding layer and at least one decoding layer.

In accordance with still another aspect of the present disclosure, there is provided a learning device for performing adjustable continual learning on a deep neural network model by using a selective deep generative replay module, including: at least one memory that stores instructions; and at least one processor configured to execute the instructions to perform or support another device to perform: (I) if a first training data is acquired from a total database and a second training data is acquired from a sub-database which is a subset of the total database, (i) a process of inputting the first training data and the second training data into the selective deep generative replay module, to thereby allow the selective deep generative replay module to generate first low-dimensional distribution features for training corresponding to the first training data and second low-dimensional distribution features for training corresponding to the second training data through a distribution analyzer included in the selective deep generative replay module, wherein a dimension of the first low-dimensional distribution features for training is lower than a dimension of the first training data and wherein a dimension of the second low-dimensional distribution features for training is lower than a dimension of the second training data, (ii) a process of inputting (1) at least one binary value for training outputted from a dynamic binary generator included in the selective deep generative replay module, (2) at least one random parameter outputted from a random parameter generator included in the selective deep generative replay module, and (3) the second low-dimensional distribution features for training into a data generator included in the selective deep generative replay module, to thereby generate a third training data corresponding to the second low-dimensional distribution features for training, according to the binary value for training and the random parameter through the data generator, and (iii) a process of inputting the first training data into a solver included in the selective deep generative replay module, to thereby allow the solver to generate labeled training data by labeling the first training data on a basis of deep learning, (II) a process of inputting the first training data, the second training data, the first low-dimensional distribution features for training, the second low-dimensional distribution features for training, the third training data and the binary value for training into a discriminator, to thereby allow the discriminator to generate a first training data score, a second training data score, a first feature distribution score, a second feature distribution score, and a third training data score, according to the binary value for training, and (III) (i) a process of calculating (1) a first discriminator loss by referring to the second training data score, the second feature distribution score, and the third training data score, (2) a second discriminator loss by referring to the first training data score, the first feature distribution score, and the third training data score, (3) a first generator loss by referring to the second feature distribution score and the third training data score, and (4) a second generator loss by referring to the first feature distribution score, the second feature distribution score, and the third training data score, (ii) a process of training the discriminator, the data generator, and the distribution analyzer such that the data generator generates (ii-1) the third training data whose at least one of a mean and a variance of feature distribution thereof is within its corresponding each of training-data threshold ranges from that of the second low-dimensional distribution features for training, if the binary value for training is determined as a first binary value and (ii-2) the third training data whose mean and variance of the feature distribution thereof are outside the respective training-data threshold ranges from those of the second low-dimensional distribution features for training, if the binary values for training is determined as equal to a second binary value, and (iii) a process of further calculating a solver loss by referring to the labeled training data and its corresponding ground truth, to thereby further train the solver with the solver loss.

As one example, at the process of (III), by referring to the binary value for training, the processor performs or supports another device to perform (i) if the binary value for training is determined as equal to the first binary value, a process of training the discriminator and the distribution analyzer by using the first discriminator loss and a process of training the data generator and the distribution analyzer by using the first generator loss and (ii) if the binary value for training is determined as equal to the second binary value, a process of training the discriminator and the distribution analyzer by using the second discriminator loss and a process of training the data generator and the distribution analyzer by using the second generator loss.

As one example, the processor performs or supports another device to perform (i) a process of training the discriminator and the distribution analyzer by using the first discriminator loss and the second discriminator loss while first parameters of the data generator are fixed and (ii) a process of training the data generator and the distribution analyzer by using the first generator loss and the second generator loss while second parameters of the discriminator are fixed.

As one example, the data generator includes at least one encoding layer and at least one decoding layer.

In accordance with still yet another aspect of the present disclosure, there is provided a continual learning device for performing adjustable continual learning on a deep neural network model by using a selective deep generative replay module, including: at least one memory that stores instructions; and at least one processor configured to execute the instructions to perform or support another device to perform: (I) on condition that a learning device has performed or supported another device to perform, (i) upon acquiring a first training data from a total database and acquiring a second training data from a sub-database which is a subset of the total database, (i-1) a process of inputting the first training data and the second training data into the selective deep generative replay module, to thereby allow the selective deep generative replay module to (1) generate first low-dimensional distribution features for training corresponding to the first training data and a second low-dimensional distribution features for training corresponding to the second training data through a distribution analyzer included in the selective deep generative replay module, wherein a dimension of the first low-dimensional distribution features for training is lower than a dimension of the first training data and wherein a dimension of the second low-dimensional distribution features for training is lower than a dimension of the second training data, (2) input at least one binary value for training outputted from a dynamic binary generator included in the selective deep generative replay module, at least one random parameter for training outputted from a random parameter generator included in the selective deep generative replay module, and the second low-dimensional distribution features for training into a data generator included in the selective deep generative replay module, and thus generate a third training data, corresponding to the second low-dimensional distribution features for training, according to the binary value for training and the random parameter for training, through the data generator, and (3) input the first training data into a solver included in the selective deep generative replay module to label the first training data and thus output labeled training data based on deep learning, through the solver, (i-2) a process of inputting the first training data, the second training data, the first low-dimensional distribution features for training, the second low-dimensional distribution features for training, the third training data and the binary value for training into a discriminator, to thereby allow the discriminator to output a first training data score, a second training data score, a first feature distribution score, a second feature distribution score, and a third training data score, according to the binary value for training, (ii) a process of inputting the first training data into the solver to thereby allow the solver to generate labeled training data by labeling the first training data based on the deep learning, (iii) process of calculating (1) a first discriminator loss by referring to the second training data score, the second feature distribution score, and the third training data score, (2) a second discriminator loss by referring to the first training data score, the first feature distribution score, and the third training data score, (3) a first generator loss by referring to the second feature distribution score and the third training data score, and (4) a second generator loss by referring to the first feature distribution score, the second feature distribution score, and the third training data score, (iv) a process of training the discriminator, the data generator, and the distribution analyzer such that the data generator generates (1) the third training data whose at least one of a mean and a variance of feature distribution thereof is within its corresponding each of training-data threshold ranges from that of the second low-dimensional distribution features for training, if the binary value for training is determined as equal to a first binary value and (2) the third training data whose mean and variance of the feature distribution thereof are outside the respective training-data threshold ranges from those of the second low-dimensional distribution features for training, if the binary values for training is determined as equal to a second binary value, and (v) a process of further calculating a solver loss by referring to the labeled training data and its corresponding ground truth, to thereby further train the solver with the solver loss, a process of acquiring a new data from a new database and (II) a process of inputting the new data into the selective deep generative replay module, to thereby allow the selective deep generative replay module to (i) generate new low-dimensional distribution features corresponding to the new data through the distribution analyzer, wherein a dimension of the new low-dimensional distribution features is lower than a dimension of the new data, (ii) input at least one binary value for testing outputted from the dynamic binary generator, at least one random parameter for testing outputted from the random parameter generator, and the new low-dimensional distribution features into the data generator, and thus generate a test data, corresponding to the new low-dimensional distribution features, according to the binary value for testing and the random parameter for testing, wherein the test data includes (1) first regeneration data whose at least one of a mean and a variance of feature distribution thereof is within its corresponding each of test-data threshold ranges from that of the new low-dimensional distribution features if the binary value for testing is determined as equal to the first binary value and (2) second regeneration data whose mean and variance of the feature distribution thereof are outside the respective test-data threshold ranges from those of the new low-dimensional distribution features if the binary value for testing is determined as equal to the second binary value, and (iii) a process of inputting the test data into the solver, to thereby allow the solver to generate a labeled test data by labeling the test data.

As one example, the processor further performs or supports another device to perform: (III) on condition that (1) the selective deep generative replay module has been replicated to generate an old selective deep generative replay module and (2) old low-dimensional distribution features including at least part of the first low-dimensional distribution features for training and the second low-dimensional distribution features for training have been inputted into the old selective deep generative replay module to generate an old data corresponding to the old low-dimensional distribution features and old labeled data corresponding to the old data, (i) a process of inputting the old data, the new data, the old low-dimensional distribution features, the new low-dimensional distribution features, the test data, and the binary value for testing into the discriminator, to thereby allow the discriminator to generate an old data score, a new data score, an old feature distribution score, a new feature distribution score, and a test data score, according to the binary value for testing, and (ii) a process of inputting the old data and the new data into the solver, to thereby allow the solver to generate new labeled data by labeling the old data and the new data based on the deep learning and (IV) (i) a process of calculating (1) a first new discriminator loss by referring to the new data score, the new feature distribution score, and the test data score, (2) a second new discriminator loss by referring to the old data score, the old feature distribution score, and the test data score, (3) a first new generator loss by referring to the new feature distribution score and the test data score, and (4) a second new generator loss by referring to the old feature distribution score, the new feature distribution score, and the test data score, (ii) a process of training the discriminator, the data generator, and the distribution analyzer such that the data generator generates (ii-1) the test data whose at least one of the mean and the variance of the feature distribution thereof is within its corresponding each of test-data threshold ranges from that of the new low-dimensional distribution features, if the binary value for testing is determined as equal to the first binary value and (ii-2) the test data whose mean and variance of the feature distribution thereof are outside the respective test-data threshold ranges from those of the new low-dimensional distribution features, if the binary values for testing is determined as equal to the second binary value, and (iii) a process of further calculating a new solver loss by referring to the new labeled data and the old labeled data, to thereby further train the solver with the new solver loss.

As one example, at the process of (II), the processor performs or supports another device to perform a process of instructing the dynamic binary generator to generate the binary value for testing, wherein a data generation ratio of the first regeneration data per the second regeneration data is inputted into the dynamic binary generator, to thereby allow the dynamic binary generator to generate the binary value for testing corresponding to (1) the first binary value for generating the first regeneration data and (2) the second binary value for generating the second regeneration data, according to the data generation ratio.

As one example, at the process of (IV), by referring to the binary value for testing, the processor performs or supports another device to perform (i) if the binary value for testing is determined as equal to the first binary value, a process of training the discriminator and the distribution analyzer by using the first new discriminator loss and a process of training the data generator and the distribution analyzer by using the first new generator loss and (ii) if the binary value for testing is determined as equal to the second binary value, a process of training the discriminator and the distribution analyzer by using the second new discriminator loss and a process of training the data generator and the distribution analyzer by using the second new generator loss.

As one example, the processor performs or supports another device to perform (i) a process of training the discriminator and the distribution analyzer by using the first new discriminator loss and the second new discriminator loss while first parameters of the data generator are fixed and (ii) a process of training the data generator and the distribution analyzer by using the first new generator loss and the second new generator loss while second parameters of the discriminator are fixed.

As one example, the data generator includes at least one encoding layer and at least one decoding layer.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
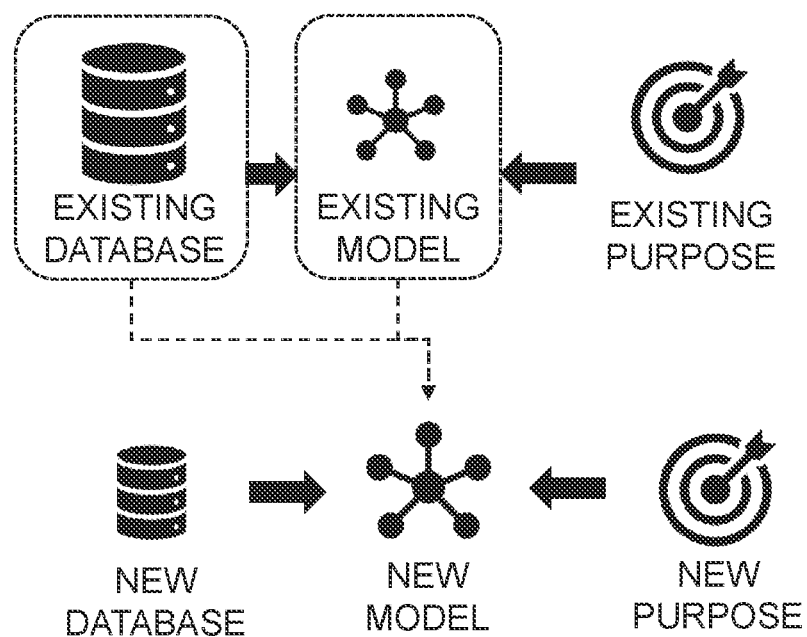
FIG. 1 is a drawing schematically illustrating a conventional continual learning method.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects. As used in this specification and the appended claims, the singular forms "a," "an," and "the" include plural referents unless the content and context clearly dictates otherwise.

To allow those skilled in the art to carry out the present disclosure easily, the example embodiments of the present disclosure by referring to attached diagrams will be explained in detail as shown below.

Figure 2:
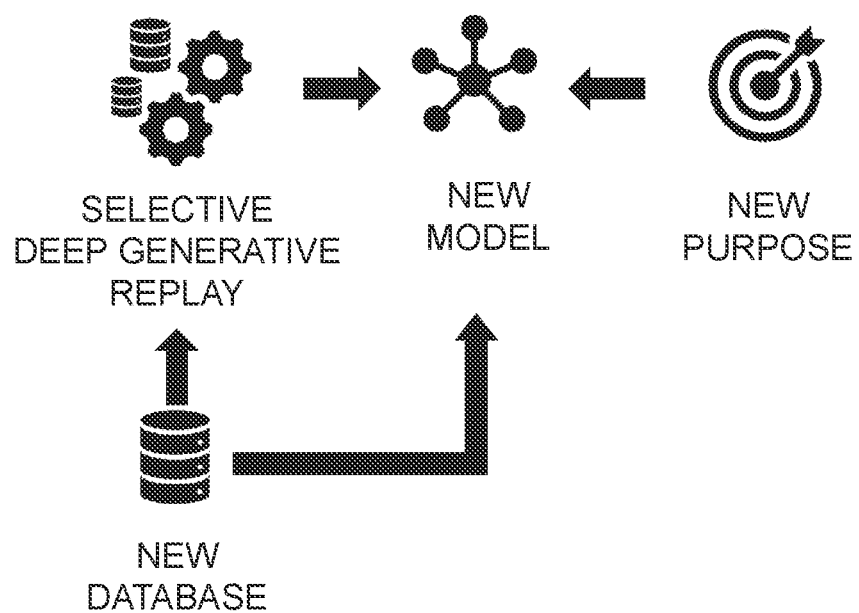
FIG. 2 is a drawing schematically illustrating a process of performing adjustable continual learning of a deep neural network model by using a selective deep generative replay module in accordance with one example embodiment of the present disclosure.

FIG. 2 is a drawing schematically illustrating a process of performing adjustable continual learning of a deep neural network model by using a selective deep generative replay module in accordance with one example embodiment of the present disclosure.

In contrast to a conventional continual learning method illustrated in FIG. 1, the adjustable continual learning method illustrated in FIG. 2 may reduce space required for storage by only storing the selective deep generative replay module instead of storing an entire database. That is, without having to store the entire database, the adjustable continual learning may be performed with data reproduced by the selective deep generative replay module adopting a Generative Adversarial Network (GAN). Further, the selective deep generative replay module may adjust a ratio of first-type data to second-type data. Herein, the first-type data may have at least one of a mean and a variance of feature distribution thereof within its corresponding each of data threshold ranges from that of a sub-database or a new database. Further, the second-type data may have the mean and the variance of the feature distribution thereof outside the respective data threshold ranges from those of the sub-database or the new database. Herein, the sub-database may be a subset of a total database, i.e., an existing database.

That is, in the method of the adjustable continual learning with the selective deep generative replay module, space required for storing the existing database by only storing the selective deep generative replay module instead of storing the entire existing database. And the neural network model may be trained to be optimized for a given task by using the data set comprised of the first-type data and the second-type data, instead of using all data in the entire existing database. Herein, the ratio of the first-type data to the second-type data may be determined by referring to the given task and the like in advance, but the scope of the present disclosure is not limited thereto. Throughout the present disclosure, the first-type data may be referred to as data having a degree of similarity to distribution of inputted data higher than a predefined threshold similarity, and the second-type data may be referred to as data having a degree of similarity to the distribution of the inputted data lower than another predefined threshold similarity.

Herein, the selective deep generative replay module may be utilized to perform the continual learning of the deep neural network model required by a device, such as, an autonomous vehicle, an autonomous aircraft, a robot, etc.

Accordingly, FIGS. 3 to 7 illustrate processes of (1) initial training of the selective deep generative replay module, (2) testing the initially trained selective deep generative replay module, and (3) continual learning of the selective deep generative replay module in order to perform the adjustable continual learning of the neural network model.

Figure 3:
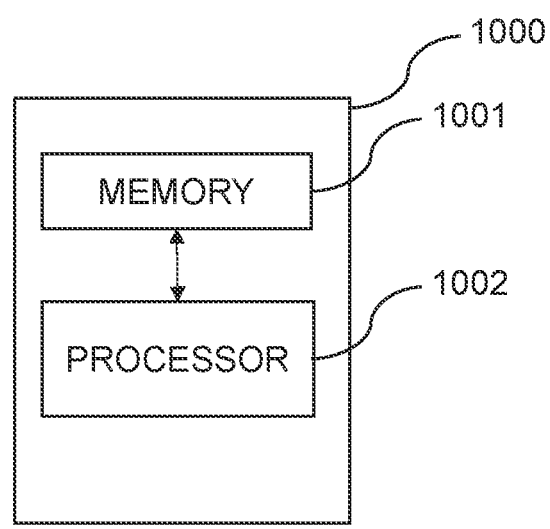
FIG. 3 is a drawing schematically illustrating a learning device for performing initial training of the selective deep generative replay module in accordance with one example embodiment of the present disclosure.

First, FIG. 3 is a drawing schematically illustrating a learning device 1000 for performing the initial training of the selective deep generative replay module in accordance with one example embodiment of the present disclosure.

By referring to FIG. 3, the learning device 1000 may include a memory 1001 for storing instructions to perform the initial training of the selective deep generative replay module and a processor 1002 for performing the initial training of the selective deep generative replay module according to the instructions in the memory 1001.

Specifically, the learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include software configuration of OS and applications that achieve specific purposes.

However, such description of the computing device does not exclude an integrated device including any combination of a processor, a memory, a medium, or any other computing components for implementing the present disclosure.

A method of performing the initial training of the selective deep generative replay module by using the learning device 1000 configured as above in accordance with one example embodiment of the present disclosure is described below by referring to FIG. 4.

First, in order to perform the initial training of the selective deep generative replay module 100, the learning device 1000 may acquire a first training data from the total database, i.e., the existing database, and acquire a second training data from the sub-database. Herein, the sub-database may be a subset of the existing database.

Next, the learning device 1000 may input the first training data and the second training data into the selective deep generative replay module 100.

Then, the selective deep generative replay module 100 may input each of the first training data and the second training data into a distribution analyzer 110, to thereby allow the distribution analyzer 110 to generate first low-dimensional distribution features for training corresponding to the first training data and second low-dimensional distribution features for training corresponding to the second training data. Herein, the distribution feature may represent, for example, a distribution of (1) characteristics of at least part of pixels in an image, (2) positions of objects in the image, (3) classification scores of the objects in the image, etc., but the scope of the present disclosure is not limited thereto, and may represent a distribution of various information that can be extracted from any data. Further, the low-dimensional distribution features may be generated by projecting input data onto a lower dimensional subspace, in order to prevent a "curse of dimensionality" problem that may be caused by irrelevant and/or unnecessary features while useful features, to be used for the adjustable continual learning of the deep neural network model, are captured among features included in the input data inputted into the selective deep generative replay module 100. And dimensionality reduction as such may be performed by feature extraction, feature selection, etc.

Subsequently, the selective deep generative replay module 100 may input at least one binary value for training outputted from a dynamic binary generator 120, at least one random parameter for training outputted from a random parameter generator 130, and the second low-dimensional distribution features for training into a data generator 140, to thereby allow the data generator 140 to generate a third training data corresponding to the second low-dimensional distribution features for training according to the binary value for training and the random parameter for training. Herein, the data generator 140 may include at least one encoding layer and at least one decoding layer.

Herein, the data generator 140 may generate the third training data by using the inputted random parameter for training and the inputted second low-dimensional distribution features for training. Further, a distribution of the third training data may be determined as similar to that of the second low-dimensional distribution features for training by referring to the binary value for training, but the present disclosure is not limited thereto. That is, for example, if the binary value for training is determined as equal to a first binary value, the third training data may have at least one of its mean and variance within its corresponding each of training-data threshold ranges from that of the second low-dimensional distribution features for training. And if the binary value for training is determined as equal to a second binary value, the third training data may have its mean and variance of the feature distribution thereof outside the respective training-data threshold ranges from those of the second low-dimensional distribution features for training. Herein, the random parameter for training may represent (1) a vector for image variation such as random noise, image orientation, attributes, etc. or (2) a distribution such as a Gaussian distribution. Further, the third training data with various distributions to be used for training may be generated by referring to the random parameter for training.

And, the learning device 1000 may input the first training data into a solver 150 in the selective deep generative replay module 100, to thereby allow the solver 150 to generate labeled training data by labeling the first training data on a basis of deep learning.

Then, the learning device 1000 may input the first training data, the second training data, the first low-dimensional distribution features for training, the second low-dimensional distribution features for training, the third training data and the binary value for training into a discriminator 200, to thereby allow the discriminator 200 to generate a first training data score, a second training data score, a first feature distribution score, a second feature distribution score, and a third training data score, by referring to the binary value for training.

Next, in order to train the distribution analyzer 110, the data generator 140, and the discriminator 200, the learning device 1000 may perform or support another device to perform a process of calculating (1) a first discriminator loss by referring to the second training data score, the second feature distribution score, and the third training data score, (2) a second discriminator loss by referring to the first training data score, the first feature distribution score, and the third training data score, (3) a first generator loss by referring to the second feature distribution score and the third training data score, and (4) a second generator loss by referring to the first feature distribution score, the second feature distribution score, and the third training data score.

Accordingly, the learning device 1000 may allow the data generator 140 to generate (1) the third training data whose at least one of the mean and the variance of the feature distribution thereof is within its corresponding each of the training-data threshold ranges from that of the second low-dimensional distribution features for training if the binary value for training is determined as equal to the first binary value and (2) the third training data whose mean and variance of the feature distribution thereof are outside the respective training-data threshold ranges from those of the second low-dimensional distribution features for training if the binary value for training is determined as equal to the second binary value. Herein, the first binary value and the second binary value may be binary values such as numbers like '1' and '0' or characters like 'a' and 'b'.

To this effect, by referring to the binary value for training, the learning device 1000 may perform or support another device to perform, (i) if the binary value for training is determined as equal to the first binary value, a process of training the discriminator 200 and the distribution analyzer 110 by using the first discriminator loss and a process of training the data generator 140 and the distribution analyzer 110 by using the first generator loss and (ii) if the binary value for training is determined as the equal to the second binary value, a process of training the discriminator 200 and the distribution analyzer 110 by using the second discriminator loss and a process of training the data generator 140 and the distribution analyzer 110 by using the second generator loss.

Herein, before performing the training processes as above, the learning device 1000 may perform or support another device to perform (i) a process of training the discriminator 200 and the distribution analyzer 110 by using the first discriminator loss and the second discriminator loss while first parameters of the data generator 140 are fixed and (ii) a process of training the data generator 140 and the distribution analyzer 110 by using the first generator loss and the second generator loss while second parameters of the discriminator 200 are fixed.

Herein, since the distribution analyzer 110, the data generator 140, and the discriminator 200, each of which is comprised of a deep network model, are all connected, it is possible to train the distribution analyzer 110, the data generator 140, and the discriminator 200 through back-propagation using the first discriminator loss, the second discriminator loss, the first generator loss, or the second generator loss. Therefore, the training processes using the losses above may be performed on the distribution analyzer 110, the data generator 140, and the discriminator 200 by using a following target function.

if binary=first binary value, $$\max V(D,A) = E_{x \sim Sub_{data}(x)}[\log D(DF_{sub}, x)] + E_{z \sim p_z(z)}[\log(1 - D(DF_{sub}, G(z)))]$$

$$\max V(G,A) = E_{z \sim p_z(z)}[\log(D(DF_{sub}, G(z)))]$$

else $$\max V(D,A) = E_{x \sim ED_{data}(x)}[\log D(DF_{ED}, x)] + E_{z \sim p_z(z)}[\log(1 - D(DF_{ED}, G(z)))]$$

$$\max V(G,A) = E_{z \sim p_z(z)}[\log(1 - D(DF_{sub}, G(z)))] + E_{z \sim p_z(z)}[\log(D(DF_{ED}, G(z)))]$$

In the target function above, x may represent the first training data or the second training data, z may represent the random parameter for training, $DF_{ED}$ may represent the first low-dimensional distribution features for training, $DF_{sub}$ may represent the second low-dimensional distribution features for training, and G(z) may represent the third training data.

The target function described above may be basically similar to that of a conventional Generative Adversarial Network (GAN), but there may be a difference in that the first low-dimensional distribution features for training and the second low-dimensional distribution features for training are inputted into the discriminator 200 to cope with the sub-database or the existing database. Also, in the training processes as above, the distribution analyzer 110 may participate in the training processes of the data generator 140 and the discriminator 200.

As a result of the training processes as described above, the data generator 140 may (i) output the first-type data, retrieved from the existing database, whose at least one of a mean and a variance of the feature distribution thereof is within its corresponding each of the training-data threshold ranges from that of the second low-dimensional distribution features for training inputted thereto, if the binary value for training is determined as equal to the first binary value, and (ii) output the second-type data, retrieved from the existing database, whose mean and variance of the feature distribution thereof are outside the respective training-data threshold ranges from those of the second low-dimensional distribution features for training inputted thereto, if the binary value for training is determined as equal to the second binary value. Subsequently, when a new data is inputted during the continual learning process, the data generator 140 may (i) output the first-type data, retrieved from the existing database, whose at least one of a mean and a variance of feature distribution thereof is within its corresponding each of test-data threshold ranges from that of the new data inputted thereto, and (ii) output the second-type data, retrieved from the existing database, whose mean and variance of the feature distribution thereof are outside the respective test-data threshold ranges from those of the new data inputted thereto. Thus, unlike the conventional continual learning method, it is not necessary to store the entire existing database.

Also, in order to improve an accuracy of the labeled training data created by the solver 150, the learning device 1000 may further calculate a solver loss corresponding to the labeled training data and its corresponding ground truth, to thereby perform processes of further training the solver 150 with the solver loss.

After completing the initial training of the selective deep generative replay module 100 as described above, a continual learning device 2000 may perform processes of testing the initially trained selective deep generative replay module 100, and in order to perform the adjustable continual learning of the deep neural network model, the continual learning may be performed on the selective deep generative replay module 100.

Figure 5:
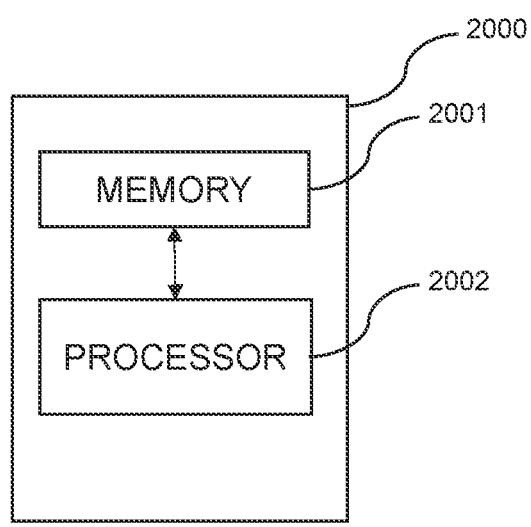
FIG. 5 is a drawing schematically illustrating a continual learning device for performing the adjustable continual learning and testing of the selective deep generative replay module in accordance with one example embodiment of the present disclosure.

By referring to FIG. 5, the continual learning device 2000 may include a memory 2001 for storing instructions to perform the adjustable continual learning and testing on the selective deep generative replay module 100 and a processor 2002 for performing the adjustable continual learning and testing on the selective deep generative replay module 100 according to the instructions in the memory 2001.

Specifically, the continual learning device 2000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include software configuration of OS and applications that achieve specific purposes.

However, such description of the computing device does not exclude an integrated device including any combination of a processor, a memory, a medium, or any other computing components for implementing the present disclosure.

Meanwhile, the learning device 1000 and the continual learning device 2000 may be installed on a same device where the neural network model, performing the adjustable continual learning with the selective deep generative replay module, is adopted. However, as another example, the learning device 1000 and the continual learning device 2000 may be installed on a shared server or a sharing device, and may transmit the labeled training data and the training data created for the adjustable continual learning to a server or a device, where the adjustable continual learning of the neural network model is performed, at a remote location, but the scope of the present disclosure is not limited thereto.

Figure 6:
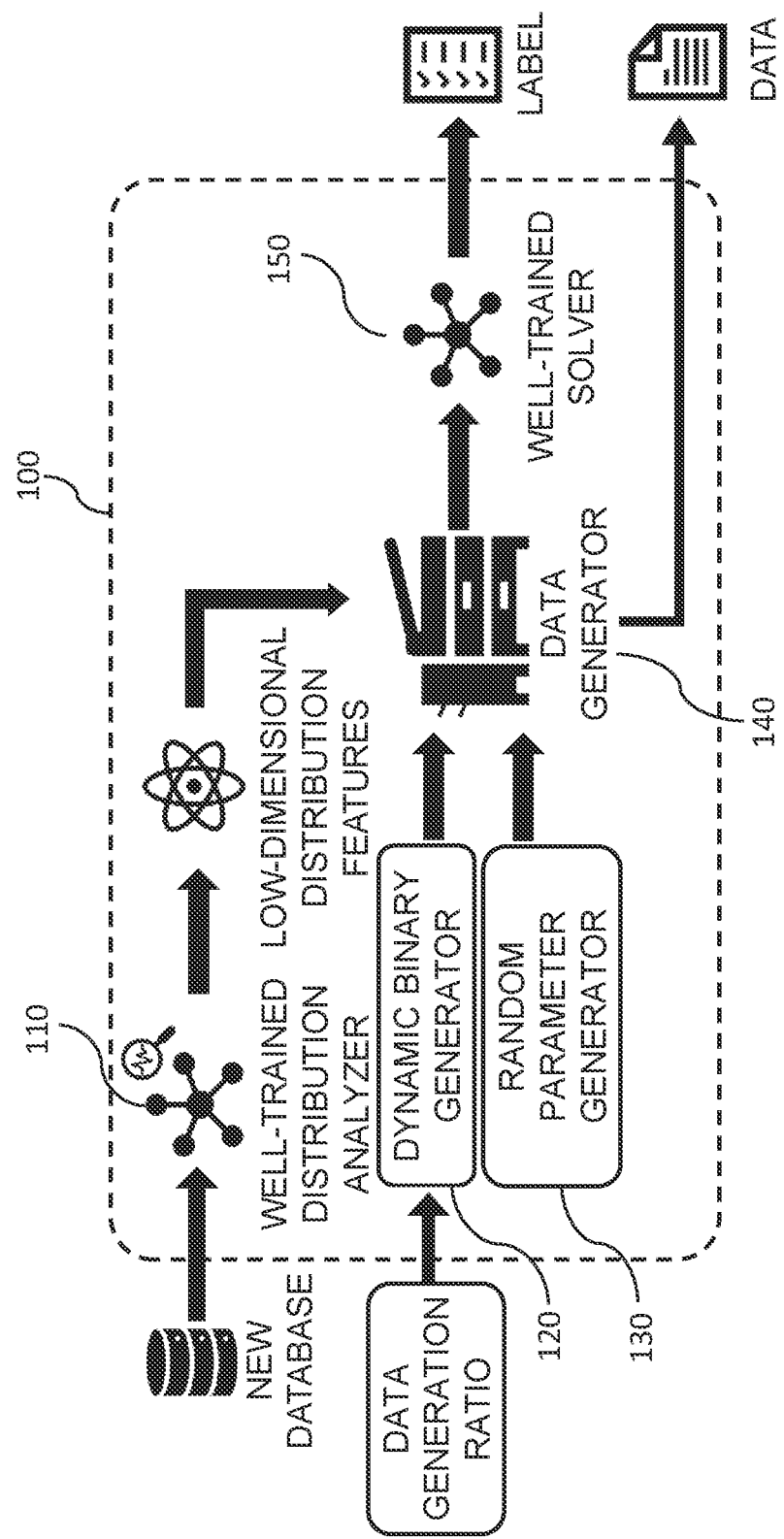
FIG. 6 is a drawing schematically illustrating a method of the continual learning device for testing the selective deep generative replay module in accordance with one example embodiment of the present disclosure.
Figure 7:
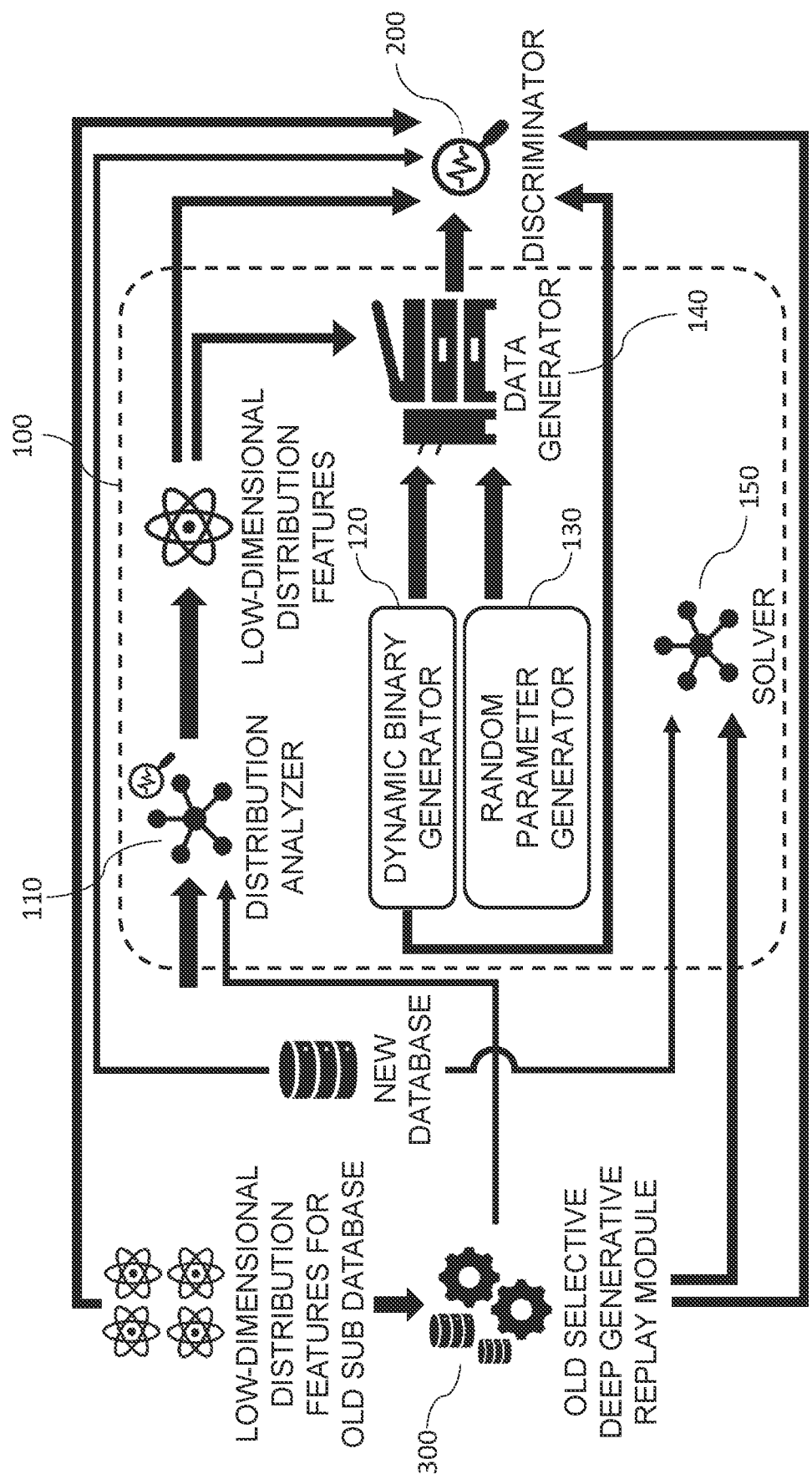
FIG. 7 is a drawing schematically illustrating a method of the continual learning device performing the continual learning of the selective deep generative replay module in accordance with one example embodiment of the present disclosure.

A method of performing the adjustable continual learning and testing on the selective deep generative replay module 100 in accordance with one example embodiment of the present disclosure by using the continual learning device 2000 configured as such is described by referring to FIGS. 6 and 7.

FIG. 6 is a drawing schematically illustrating a method of the continual learning device 2000 performing processes of testing the selective deep generative replay module 100 in accordance with one example embodiment of the present disclosure. In the description below, the part easily deducible from the explanation of FIG. 4 will be omitted.

First, on condition that the selective deep generative replay module 100 has completed its initial training with the learning device 1000 as explained above by referring to FIG. 4, the continual learning device 2000 may acquire the new data from the new database which is newly established.

Then, the continual learning device 2000 may input the acquired new data into the selective deep generative replay module 100.

Subsequently, the selective deep generative replay module 100 may input the new data into the distribution analyzer 110, to thereby allow the distribution analyzer 110 to generate new low-dimensional distribution features corresponding to the new data. Herein, the low-dimensional distribution features may be generated by projecting input data onto lower dimensional subspace, in order to prevent a "curse of dimensionality" problem that may be caused by irrelevant and/or unnecessary features while useful features, to be used for the adjustable continual learning of the deep neural network model, are captured among features included in the input data into the selective deep generative replay module 100. And the dimensionality reduction as such may be performed by feature extraction, feature selection, etc.

And, the selective deep generative replay module 100 may input at least one binary value for testing outputted from the dynamic binary generator 120, at least one random parameter for testing outputted from the random parameter generator 130, and the new low-dimensional distribution features into the data generator 140, to thereby allow the data generator 140 to generate a test data, by referring to the binary value for testing and the random parameter for testing. Herein, the test data may correspond to the new low-dimensional distribution features. Further, the data generator 140 may generate the test data corresponding to a distribution of the new data even if the existing database for training and the sub-database for training used in the initial learning have been deleted. Herein, a distribution of the generated test data may be identical or similar to that of data in the existing database for training and the sub-database for training. Also, the test data may include (1) first regeneration data whose at least one of a mean and a variance of feature distribution thereof is within its corresponding each of the test-data threshold ranges from that of the new low-dimensional distribution features if the binary value for testing is determined as equal to the first binary value and (2) second regeneration data whose mean and variance of the feature distribution thereof are outside the respective first test-data threshold ranges from those of the new low-dimensional distribution features if the binary value for testing is determined as equal to the second binary value. Herein, the first binary value and the second binary value may be binary values such as numbers like '1' and '0' or characters like 'a' and 'b'.

Then, the continual learning device 2000 may input the test data into the solver 150, to thereby allow the solver 150 to generate a labeled test data by labeling the test data on a basis of deep learning.

Herein, the continual learning device 2000 may perform or support another device to perform a process of instructing the dynamic binary generator 120 to generate the binary value for testing. Herein, a data generation ratio of the first regeneration data per the second regeneration data may be inputted into the dynamic binary generator 120, to thereby allow the dynamic binary generator 120 to generate the binary value for testing corresponding to the first binary value for generating the first regeneration data and the second binary value for generating the second regeneration data, according to the data generation ratio.

FIG. 7 is a drawing schematically illustrating a method of the continual learning device 2000 performing the continual learning of the selective deep generative replay module 100 in accordance with one example embodiment of the present disclosure.

First, the continual learning device 2000 may (i) replicate the initially trained selective deep generative replay module 100 to generate an old selective deep generative replay module 300, and (ii) input old low-dimensional distribution features including at least part of the first low-dimensional distribution features for training and the second low-dimensional distribution features for training into the old selective deep generative replay module 300, to thereby allow the old selective deep generative replay module 300 to generate an old data corresponding to the old low-dimensional distribution features and old labeled data corresponding to the old data.

On condition that the old data and the old labeled data corresponding to the old data have been generated, the continual learning device 2000 may input the old data, the new data, the old low-dimensional distribution features, the new low-dimensional distribution features, the test data, and the binary value for testing into the discriminator 200, to thereby allow the discriminator 200 to generate an old data score, a new data score, an old feature distribution score, a new feature distribution score, and a test data score, by referring to the binary value for testing.

Also, the continual learning device 2000 may input the old data and the new data into the solver 150, to thereby allow the solver 150 to generate new labeled data by labeling the old data and the new data on the basis of the deep learning.

Next, in order to train the distribution analyzer 110, the data generator 140, and the discriminator 200, the continual learning device 2000 may perform or support another device to perform a process of calculating (1) a first new discriminator loss by referring to a new data score, a new feature distribution score, and a test data score, (2) a second new discriminator loss by referring to an old data score, an old feature distribution score, and the test data score, (3) a first new generator loss by referring to the new feature distribution score and the test data score, and (4) a second new generator loss by referring to the old feature distribution score, the new feature distribution score and the test data score.

Accordingly, the learning device 1000 may allow the data generator 140 to generate (1) the test data whose at least one of the mean and the variance of the feature distribution thereof is within its corresponding each of the test-data threshold ranges from that of the new low-dimensional distribution features if the binary value for testing is determined as equal to the first binary value and (2) the test data whose mean and variance of the feature distribution thereof are outside the respective test-data threshold ranges from those of the new low-dimensional distribution features if the binary value for testing is determined as equal to the second binary value.

To this effect, by referring to the binary value for testing, the continual learning device 2000 may perform or support another device to perform, (i) if the binary value for testing is determined as equal to the first binary value, a process of training the discriminator 200 and the distribution analyzer 110 by using the first new discriminator loss and a process of training the data generator 140 and the distribution analyzer 110 by using the first new generator loss and (ii) if the binary value for testing is determined as the equal to second binary value, a process of training the discriminator 200 and the distribution analyzer 110 by using the second new discriminator loss and a process of training the data generator 140 and the distribution analyzer 110 by using the second new generator loss.

Herein, before performing the training processes as above, the continual learning device 2000 may perform or support another device to perform (i) a process of training the discriminator 200 and the distribution analyzer 110 by using the first new discriminator loss and the second new discriminator loss while the first parameters of the data generator 140 are fixed and (ii) a process of training the data generator 140 and the distribution analyzer 110 by using the first new generator loss and the second new generator loss while the second parameters of the discriminator 200 are fixed.

Herein, since the distribution analyzer 110, the data generator 140 and the discriminator 200, each of which is comprised of the deep network model, are all connected, it is possible to train the distribution analyzer 110, the data generator 140, and the discriminator 200 through back-propagation using the first new discriminator loss, the second new discriminator loss, the first new generator loss, or the second new generator loss. Therefore, the training processes using the losses above may be performed on the distribution analyzer 110, the data generator 140 and the discriminator 200 by using a following target function.

if binary=first binary value, $$\max\ V(D,A) = E_{x \sim Sub_{data}(x)}[\log D(DF_{sub},x)] + E_{z \sim p_z(z)}[\log(1 - D(DF_{sub},G(z)))]$$

$$\max\ V(G,A) = E_{z \sim p_z(z)}[\log(D(DF_{sub},G(z)))]$$

else $$\max\ V(D,A) = E_{x \sim ED_{data}(x)}[\log D(DF_{ED},x)] + E_{z \sim p_z(z)}[\log(1 - D(DF_{ED},G(z)))]$$

$$\max\ V(G,A) = E_{z \sim p_z(z)}[\log(1 - D(DF_{sub},G(z)))] + E_{z \sim p_z(z)}[\log(D(DF_{ED},G(z)))]$$

In the target function above, x may represent the old data or the new data, z may represent the random parameter for testing, $DF_{ED}$ may represent the old low-dimensional distribution features, $DF_{sub}$ may represent the new low-dimensional distribution features, and G(z) may represent the test data.

The target function described above may be basically similar to that of the initial training on the selective deep generative replay module, but there may be a difference in that the old low-dimensional distribution features including at least part of the stored first low-dimensional distribution features and the stored second low-dimensional distribution features are inputted into the discriminator 200. Further, there may be another difference in that the old low-dimensional distribution features are inputted into the old selective deep generative replay module, to thereby allow the old selective deep generative replay module to generate the old data corresponding to the old low-dimensional distribution features, and thus to input the old data into the distribution analyzer 110 and the discriminator 200.

Also, in order to improve an accuracy of the new labeled data created by the solver 150, the continual learning device 2000 may further calculate a new solver loss corresponding to the new labeled data and the old labeled data, to thereby perform processes of further training the solver 150 with the new solver loss.

The continual learning device 2000 may perform the continual learning of the selective deep generative replay module 100 for every iteration by using the method explained above. But the scope of the present disclosure is not limited thereto, and a cycle of renewing the old selective deep generative replay module 300, for performing the continual learning of the selective deep generative replay module 100, may be affected by a cycle of performing the adjustable continual learning of the neural network model in a mutually complementary manner. As one example, if an adjustment of the continual learning of the neural network model is required for a new task or performance improvement of the neural network model, then the continual learning of the selective deep generative replay module 100 may be performed in order to create the training data with a new ratio.

Meanwhile, in the above, the continual learning method is described to be proceeding immediately after the completion of the initial training, but the same can be applied to successive rounds of the continual learning.

Figure 4:
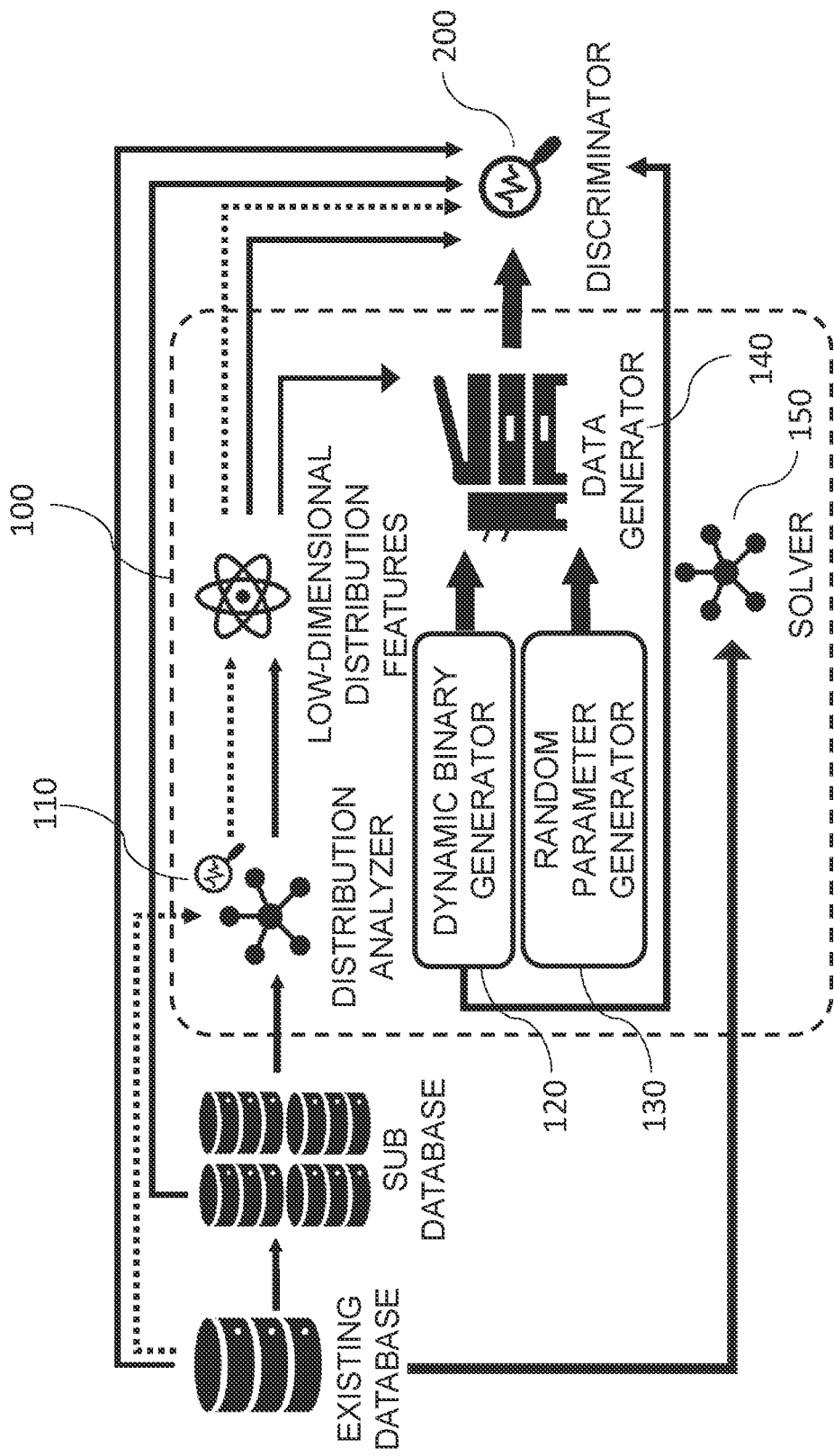
FIG. 4 is a drawing schematically illustrating a method of the learning device performing the initial training of the selective deep generative replay module in accordance with one example embodiment of the present disclosure.

That is, in the method described by referring to FIG. 6 and FIG. 7, the new database can replace the sub-database in the initial training described by referring to FIG. 4, and then, for subsequent continual learning, the continual learning can be performed by using a next new database.

The present disclosure has an effect of reducing space required for storing the existing database by only storing the selective deep generative replay module instead of storing the entire existing database used for training the neural network model.

The present disclosure has another effect of training the neural network model with a fixed amount of data, created by using the selective deep generative replay module, instead of using the entire existing database and the entire new database, to thereby reduce the time required to train the neural network model.

The present disclosure has still another effect of creating a data set comprised of first-type data whose distribution is similar to that of a new database and second-type data whose distribution is different from that of the new database by using the selective deep generative replay module with the Generative Adversarial Network (GAN), and then train the neural network model using the created data set, to thereby generate a neural network model optimized for the given task, instead of training the neural network model with the entire existing database and the entire new database.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for performing adjustable continual learning on a deep neural network model by using a selective deep generative replay module, comprising steps of:
(a) a learning device, if a first training data is acquired from a total database and a second training data is acquired from a sub-database which is a subset of the total database, performing or supporting another device to perform (i) a process of inputting the first training data and the second training data into the selective deep generative replay module, to thereby allow the selective deep generative replay module to generate first low-dimensional distribution features for training corresponding to the first training data and second low-dimensional distribution features for training corresponding to the second training data through a distribution analyzer included in the selective deep generative replay module, wherein a dimension of the first low-dimensional distribution features for training is lower than a dimension of the first training data and wherein a dimension of the second low-dimensional distribution features for training is lower than a dimension of the second training data, (ii) a process of inputting (1) at least one binary value for training outputted from a dynamic binary generator included in the selective deep generative replay module, (2) at least one random parameter outputted from a random parameter generator included in the selective deep generative replay module, and (3) the second low-dimensional distribution features for training into a data generator included in the selective deep generative replay module, to thereby generate a third training data corresponding to the second low-dimensional distribution features for training, according to the binary value for training and the random parameter through the data generator, and (iii) a process of inputting the first training data into a solver included in the selective deep generative replay module, to thereby allow the solver to generate labeled training data by labeling the first training data on a basis of deep learning;
(b) the learning device performing or supporting another device to perform a process of inputting the first training data, the second training data, the first low-dimensional distribution features for training, the second low-dimensional distribution features for training, the third training data and the binary value for training into a discriminator, to thereby allow the discriminator to generate a first training data score, a second training data score, a first feature distribution score, a second feature distribution score, and a third training data score, according to the binary value for training; and
(c) the learning device performing or supporting another device to perform (i) a process of calculating (1) a first discriminator loss by referring to the second training data score, the second feature distribution score, and the third training data score, (2) a second discriminator loss by referring to the first training data score, the first feature distribution score, and the third training data score, (3) a first generator loss by referring to the second feature distribution score and the third training data score, and (4) a second generator loss by referring to the first feature distribution score, the second feature distribution score, and the third training data score, (ii) a process of training the discriminator, the data generator, and the distribution analyzer such that the data generator generates (ii–1) the third training data whose at least one of a mean and a variance of feature distribution thereof is within its corresponding each of training-data threshold ranges from that of the second low-dimensional distribution features for training, if the binary value for training is determined as a first binary value and (ii–2) the third training data whose mean and variance of the feature distribution thereof are outside the respective training-data threshold ranges from those of the second low-dimensional distribution features for training, if the binary values for training is determined as equal to a second binary value, and (iii) a process of further calculating a solver loss by referring to the labeled training data and its corresponding ground truth, to thereby further train the solver with the solver loss.

2. The method of claim 1, wherein, at the step of (c), by referring to the binary value for training, the learning device performs or supports another device to perform (i) if the binary value for training is determined as equal to the first binary value, a process of training the discriminator and the distribution analyzer by using the first discriminator loss and a process of training the data generator and the distribution analyzer by using the first generator loss and (ii) if the binary value for training is determined as equal to the second binary value, a process of training the discriminator and the distribution analyzer by using the second discriminator loss and a process of training the data generator and the distribution analyzer by using the second generator loss.

3. The method of claim 2, wherein the learning device performs or supports another device to perform (i) a process of training the discriminator and the distribution analyzer by using the first discriminator loss and the second discriminator loss while first parameters of the data generator are fixed and (ii) a process of training the data generator and the distribution analyzer by using the first generator loss and the second generator loss while second parameters of the discriminator are fixed.

4. The method of claim 1, wherein the data generator includes at least one encoding layer and at least one decoding layer.

5. A method for performing adjustable continual learning on a deep neural network model by using a selective deep generative replay module, comprising steps of:

(a) on condition that a learning device has performed or supported another device to perform, (i) upon acquiring a first training data from a total database and acquiring a second training data from a sub-database which is a subset of the total database, (i-1) a process of inputting the first training data and the second training data into the selective deep generative replay module, to thereby allow the selective deep generative replay module to (1) generate first low-dimensional distribution features for training corresponding to the first training data and second low-dimensional distribution features for training corresponding to the second training data through a distribution analyzer included in the selective deep generative replay module, wherein a dimension of the first low-dimensional distribution features for training is lower than a dimension of the first training data and wherein a dimension of the second low-dimensional distribution features for training is lower than a dimension of the second training data, (2) input at least one binary value for training outputted from a dynamic binary generator included in the selective deep generative replay module, at least one random parameter for training outputted from a random parameter generator included in the selective deep generative replay module, and the second low-dimensional distribution features for training into a data generator included in the selective deep generative replay module, and thus generate a third training data, corresponding to the second low-dimensional distribution features for training, according to the binary value for training and the random parameter for training, through the data generator, and (3) input the first training data into a solver included in the selective deep generative replay module to label the first training data and thus output labeled training data based on deep learning, through the solver, (i-2) a process of inputting the first training data, the second training data, the first low-dimensional distribution features for training, the second low-dimensional distribution features for training, the third training data and the binary value for training into a discriminator, to thereby allow the discriminator to output a first training data score, a second training data score, a first feature distribution score, a second feature distribution score, and a third training data score, according to the binary value for training, (ii) a process of inputting the first training data into the solver to thereby allow the solver to generate labeled training data by labeling the first training data based on the deep learning, (iii) process of calculating (1) a first discriminator loss by referring to the second training data score, the second feature distribution score, and the third training data score, (2) a second discriminator loss by referring to the first training data score, the first feature distribution score, and the third training data score, (3) a first generator loss by referring to the second feature distribution score and the third training data score, and (4) a second generator loss by referring to the first feature distribution score, the second feature distribution score, and the third training data score, (iv) a process of training the discriminator, the data generator, and the distribution analyzer such that the data generator generates (1) the third training data whose at least one of a mean and a variance of feature distribution thereof is within its corresponding each of training-data threshold ranges from that of the second low-dimensional distribution features for training, if the binary value for training is determined as equal to a first binary value and (2) the third training data whose mean and variance of the feature distribution thereof are outside the respective training-data threshold ranges from those of the second low-dimensional distribution features for training, if the binary values for training is determined as equal to a second binary value, and (v) a process of further calculating a solver loss by referring to the labeled training data and its corresponding ground truth, to thereby further train the solver with the solver loss, a continual learning device performing or supporting another device to perform a process of acquiring a new data from a new database; and (b) the continual learning device performing or supporting another device to perform a process of inputting the new data into the selective deep generative replay module, to thereby allow the selective deep generative replay module to (i) generate new low-dimensional distribution features corresponding to the new data through the distribution analyzer, wherein a dimension of the new low-dimensional distribution features is lower than a dimension of the new data, (ii) input at least one binary value for testing outputted from the dynamic binary generator, at least one random parameter for testing outputted from the random parameter generator, and the new low-dimensional distribution features into the data generator, and thus generate a test data, corresponding to the new low-dimensional distribution features, according to the binary value for testing and the random parameter for testing, wherein the test data includes (1) first regeneration data whose at least one of a mean and a variance of feature distribution thereof is within its corresponding each of test-data threshold ranges from that of the new low-dimensional distribution features if the binary value for testing is determined as equal to the first binary value and (2) second regeneration data whose mean and variance of the feature distribution thereof are outside the respective test-data threshold ranges from those of the new low-dimensional distribution features if the binary value for testing is determined as equal to the second binary value, and (iii) a process of inputting the test data into the solver, to thereby allow the solver to generate a labeled test data by labeling the test data.

6. The method of claim 5, further comprising steps of:
(c) on condition that (1) the selective deep generative replay module has been replicated to generate an old selective deep generative replay module and (2) old low-dimensional distribution features including at least part of the first low-dimensional distribution features for training and the second low-dimensional distribution features for training have been inputted into the old selective deep generative replay module to generate an old data corresponding to the old low-dimensional distribution features and old labeled data corresponding to the old data, the continual learning device performing or supporting another device to perform (i) a process of inputting the old data, the new data, the old low-dimensional distribution features, the new low-dimensional distribution features, the test data, and the binary value for testing into the discriminator, to thereby allow the discriminator to generate an old data score, a new data score, an old feature distribution score, a new feature distribution score, and a test data score, according to the binary value for testing, and (ii) a process of inputting the old data and the new data into the solver, to thereby allow the solver to generate new labeled data by labeling the old data and the new data based on the deep learning; and
(d) the continual learning device performing or supporting another device to perform (i) a process of calculating (1) a first new discriminator loss by referring to the new data score, the new feature distribution score, and the test data score, (2) a second new discriminator loss by referring to the old data score, the old feature distribution score, and the test data score, (3) a first new generator loss by referring to the new feature distribution score and the test data score, and (4) a second new generator loss by referring to the old feature distribution score, the new feature distribution score, and the test data score, (ii) a process of training the discriminator, the data generator, and the distribution analyzer such that the data generator generates (ii-1) the test data whose at least one of the mean and the variance of the feature distribution thereof is within its corresponding each of the test-data threshold ranges from that of the new low-dimensional distribution features, if the binary value for testing is determined as equal to the first binary value and (ii-2) the test data whose mean and variance of the feature distribution thereof are outside the respective test-data threshold ranges from those of the new low-dimensional distribution features, if the binary values for testing is determined as equal to the second binary value, and (iii) a process of further calculating a new solver loss by referring to the new labeled data and the old labeled data, to thereby further train the solver with the new solver loss.

7. The method of claim 5, wherein, at the step of (b), the continual learning device performs or supports another device to perform a process of instructing the dynamic binary generator to generate the binary value for testing, wherein a data generation ratio of the first regeneration data per the second regeneration data is inputted into the dynamic binary generator, to thereby allow the dynamic binary generator to generate the binary value for testing corresponding to (1) the first binary value for generating the first regeneration data and (2) the second binary value for generating the second regeneration data, according to the data generation ratio.

8. The method of claim 6, wherein, at the step of (d), by referring to the binary value for testing, the continual learning device performs or supports another device to perform (i) if the binary value for testing is determined as equal to the first binary value, a process of training the discriminator and the distribution analyzer by using the first new discriminator loss and a process of training the data generator and the distribution analyzer by using the first new generator loss and (ii) if the binary value for testing is determined as equal to the second binary value, a process of training the discriminator and the distribution analyzer by using the second new discriminator loss and a process of training the data generator and the distribution analyzer by using the second new generator loss.

9. The method of claim 8, wherein the continual learning device performs or supports another device to perform (i) a process of training the discriminator and the distribution analyzer by using the first new discriminator loss and the second new discriminator loss while first parameters of the data generator are fixed and (ii) a process of training the data generator and the distribution analyzer by using the first new generator loss and the second new generator loss while second parameters of the discriminator are fixed.

10. The method of claim 5, wherein the data generator includes at least one encoding layer and at least one decoding layer.

11. A learning device for performing adjustable continual learning on a deep neural network model by using a selective deep generative replay module, comprising:
at least one memory that stores instructions; and
at least one processor configured to execute the instructions to perform or support another device to perform:
(I) if a first training data is acquired from a total database and a second training data is acquired from a sub-database which is a subset of the total database, (i) a process of inputting the first training data and the second training data into the selective deep generative replay module, to thereby allow the selective deep generative replay module to generate first low-dimensional distribution features for training corresponding to the first training data and second low-dimensional distribution features for training corresponding to the second training data through a distribution analyzer included in the selective deep generative replay module, wherein a dimension of the first low-dimensional distribution features for training is lower than a dimension of the first training data and wherein a dimension of the second low-dimensional distribution features for training is lower than a dimension of the second training data, (ii) a process of inputting (1) at least one binary value for training outputted from a dynamic binary generator included in the selective deep generative replay module, (2) at least one random parameter outputted from a random parameter generator included in the selective deep generative replay module, and (3) the second low-dimensional distribution features for training into a data generator included in the selective deep generative replay module, to thereby generate a third training data corresponding to the second low-dimensional distribution features for training, according to the binary value for training and the random parameter through the data generator, and (iii) a process of inputting the first training data into a solver included in the selective deep generative replay module, to thereby allow the solver to generate labeled training data by labeling the first training data on a basis of deep learning, (II) a process of inputting the first training data, the second training data, the first low-dimensional distribution features for training, the second low-dimensional distribution features for training, the third training data and the binary value for training into a discriminator, to thereby allow the discriminator to generate a first training data score, a second training data score, a first feature distribution score, a second feature distribution score, and a third training data score, according to the binary value for training, and (III) (i) a process of calculating (1) a first discriminator loss by referring to the second training data score, the second feature distribution score, and the third training data score, (2) a second discriminator loss by referring to the first training data score, the first feature distribution score, and the third training data score, (3) a first generator loss by referring to the second feature distribution score and the third training data score, and (4) a second generator loss by referring to the first feature distribution score, the second feature distribution score, and the third training data score, (ii) a process of training the discriminator, the data generator, and the distribution analyzer such that the data generator generates (ii-1) the third training data whose at least one of a mean and a variance of feature distribution thereof is within its corresponding each of training-data threshold ranges from that of the second low-dimensional distribution features for training, if the binary value for training is determined as a first binary value and (ii-2) the third training data whose mean and variance of the feature distribution thereof are outside the respective training-data threshold ranges from those of the second low-dimensional distribution features for training, if the binary values for training is determined as equal to a second binary value, and (iii) a process of further calculating a solver loss by referring to the labeled training data and its corresponding ground truth, to thereby further train the solver with the solver loss.

12. The learning device of claim 11, wherein, at the process of (III), by referring to the binary value for training, the processor performs or supports another device to perform (i) if the binary value for training is determined as equal to the first binary value, a process of training the discriminator and the distribution analyzer by using the first discriminator loss and a process of training the data generator and the distribution analyzer by using the first generator loss and (ii) if the binary value for training is determined as equal to the second binary value, a process of training the discriminator and the distribution analyzer by using the second discriminator loss and a process of training the data generator and the distribution analyzer by using the second generator loss.

13. The learning device of claim 12, wherein the processor performs or supports another device to perform (i) a process of training the discriminator and the distribution analyzer by using the first discriminator loss and the second discriminator loss while first parameters of the data generator are fixed and (ii) a process of training the data generator and the distribution analyzer by using the first generator loss and the second generator loss while second parameters of the discriminator are fixed.

14. The learning device of claim 11, wherein the data generator includes at least one encoding layer and at least one decoding layer.

15. A continual learning device for performing adjustable continual learning on a deep neural network model by using a selective deep generative replay module, comprising:
at least one memory that stores instructions; and
at least one processor configured to execute the instructions to perform or support another device to perform:
(I) on condition that a learning device has performed or supported another device to perform, (i) upon acquiring a first training data from a total database and acquiring a second training data from a sub-database which is a subset of the total database, (i-1) a process of inputting the first training data and the second training data into the selective deep generative replay module, to thereby allow the selective deep generative replay module to (1) generate first low-dimensional distribution features for training corresponding to the first training data and a second low-dimensional distribution features for training corresponding to the second training data through a distribution analyzer included in the selective deep generative replay module, wherein a dimension of the first low-dimensional distribution features for training is lower than a dimension of the first training data and wherein a dimension of the second low-dimensional distribution features for training is lower than a dimension of the second training data, (2) input at least one binary value for training outputted from a dynamic binary generator included in the selective deep generative replay module, at least one random parameter for training outputted from a random parameter generator included in the selective deep generative replay module, and the second low-dimensional distribution features for training into a data generator included in the selective deep generative replay module, and thus generate a third training data, corresponding to the second low-dimensional distribution features for training, according to the binary value for training and the random parameter for training, through the data generator, and (3) input the first training data into a solver included in the selective deep generative replay module to label the first training data and thus output labeled training data based on deep learning, through the solver, (i-2) a process of inputting the first training data, the second training data, the first low-dimensional distribution features for training, the second low-dimensional distribution features for training, the third training data and the binary value for training into a discriminator, to thereby allow the discriminator to output a first training data score, a second training data score, a first feature distribution score, a second feature distribution score, and a third training data score, according to the binary value for training, (ii) a process of inputting the first training data into the solver to thereby allow the solver to generate labeled training data by labeling the first training data based on the deep learning, (iii) process of calculating (1) a first discriminator loss by referring to the second training data score, the second feature distribution score, and the third training data score, (2) a second discriminator loss by referring to the first training data score, the first feature distribution score, and the third training data score, (3) a first generator loss by referring to the second feature distribution score and the third training data score, and (4) a second generator loss by referring to the first feature distribution score, the second feature distribution score, and the third training data score, (iv) a process of training the discriminator, the data generator, and the distribution analyzer such that the data generator generates (1) the third training data whose at least one of a mean and a variance of feature distribution thereof is within its corresponding each of training-data threshold ranges from that of the second low-dimensional distribution features for training, if the binary value for training is determined as equal to a first binary value and (2) the third training data whose mean and variance of the feature distribution thereof are outside the respective training-data threshold ranges from those of the second low-dimensional distribution features for training, if the binary values for training is determined as equal to a second binary value, and (v) a process of further calculating a solver loss by referring to the labeled training data and its corresponding ground truth, to thereby further train the solver with the solver loss, a process of acquiring a new data from a new database and (II) a process of inputting the new data into the selective deep generative replay module, to thereby allow the selective deep generative replay module to (i) generate new low-dimensional distribution features corresponding to the new data through the distribution analyzer, wherein a dimension of the new low-dimensional distribution features is lower than a dimension of the new data, (ii) input at least one binary value for testing outputted from the dynamic binary generator, at least one random parameter for testing outputted from the random parameter generator, and the new low-dimensional distribution features into the data generator, and thus generate a test data, corresponding to the new low-dimensional distribution features, according to the binary value for testing and the random parameter for testing, wherein the test data includes (1) first regeneration data whose at least one of a mean and a variance of feature distribution thereof is within its corresponding each of test-data threshold ranges from that of the new low-dimensional distribution features if the binary value for testing is determined as equal to the first binary value and (2) second regeneration data whose mean and variance of the feature distribution thereof are outside the respective test-data threshold ranges from those of the new low-dimensional distribution features if the binary value for testing is determined as equal to the second binary value, and (iii) a process of inputting the test data into the solver, to thereby allow the solver to generate a labeled test data by labeling the test data.

16. The continual learning device of claim 15, wherein the processor further performs or supports another device to perform:

(III) on condition that (1) the selective deep generative replay module has been replicated to generate an old selective deep generative replay module and (2) old low-dimensional distribution features including at least part of the first low-dimensional distribution features for training and the second low-dimensional distribution features for training have been inputted into the old selective deep generative replay module to generate an old data corresponding to the old low-dimensional distribution features and old labeled data corresponding to the old data, (i) a process of inputting the old data, the new data, the old low-dimensional distribution features, the new low-dimensional distribution features, the test data, and the binary value for testing into the discriminator, to thereby allow the discriminator to generate an old data score, a new data score, an old feature distribution score, a new feature distribution score, and a test data score, according to the binary value for testing, and (ii) a process of inputting the old data and the new data into the solver, to thereby allow the solver to generate new labeled data by labeling the old data and the new data based on the deep learning and (IV) (i) a process of calculating (1) a first new discriminator loss by referring to the new data score, the new feature distribution score, and the test data score, (2) a second new discriminator loss by referring to the old data score, the old feature distribution score, and the test data score, (3) a first new generator loss by referring to the new feature distribution score and the test data score, and (4) a second new generator loss by referring to the old feature distribution score, the new feature distribution score, and the test data score, (ii) a process of training the discriminator, the data generator, and the distribution analyzer such that the data generator generates (ii-1) the test data whose at least one of the mean and the variance of the feature distribution thereof is within its corresponding each of the test-data threshold ranges from that of the new low-dimensional distribution features, if the binary value for testing is determined as equal to the first binary value and (ii-2) the test data whose mean and variance of the feature distribution thereof are outside the respective test-data threshold ranges from those of the new low-dimensional distribution features, if the binary values for testing is determined as equal to the second binary value, and (iii) a process of further calculating a new solver loss by referring to the new labeled data and the old labeled data, to thereby further train the solver with the new solver loss.

17. The continual learning device of claim 15, wherein, at the process of (II), the processor performs or supports another device to perform a process of instructing the dynamic binary generator to generate the binary value for testing, wherein a data generation ratio of the first regeneration data per the second regeneration data is inputted into the dynamic binary generator, to thereby allow the dynamic binary generator to generate the binary value for testing corresponding to (1) the first binary value for generating the first regeneration data and (2) the second binary value for generating the second regeneration data, according to the data generation ratio.

18. The continual learning device of claim 16, wherein, at the process of (IV), by referring to the binary value for testing, the processor performs or supports another device to perform (i) if the binary value for testing is determined as equal to the first binary value, a process of training the discriminator and the distribution analyzer by using the first new discriminator loss and a process of training the data generator and the distribution analyzer by using the first new generator loss and (ii) if the binary value for testing is determined as equal to the second binary value, a process of training the discriminator and the distribution analyzer by using the second new discriminator loss and a process of training the data generator and the distribution analyzer by using the second new generator loss.

19. The continual learning device of claim 18, wherein the processor performs or supports another device to perform (i) a process of training the discriminator and the distribution analyzer by using the first new discriminator loss and the second new discriminator loss while first parameters of the data generator are fixed and (ii) a process of training the data generator and the distribution analyzer by using the first new generator loss and the second new generator loss while second parameters of the discriminator are fixed.

20. The continual learning device of claim 15, wherein the data generator includes at least one encoding layer and at least one decoding layer.

\* \* \* \* \*